(12) United States Patent
Merzhaeuser et al.

(10) Patent No.: US 10,794,359 B2
(45) Date of Patent: Oct. 6, 2020

(54) JOINTED WIND TURBINE BLADE WITH NOISE REDUCTION TAPE

(71) Applicant: General Electric Company, Schenectady, NY (US)

(72) Inventors: Thomas Merzhaeuser, Munich (DE); Andreas Herrig, Garching b. Muenchen (DE)

(73) Assignee: General Electric Company, Schenectady, NY (US)

( * ) Notice: Subject to any disclaimer, the term of this patent is extended or adjusted under 35 U.S.C. 154(b) by 55 days.

(21) Appl. No.: 16/139,197

(22) Filed: Sep. 24, 2018

(65) Prior Publication Data
US 2020/0095976 A1   Mar. 26, 2020

(51) Int. Cl.
*F03D 1/06* (2006.01)
*B29C 65/50* (2006.01)

(52) U.S. Cl.
CPC ........ *F03D 1/0675* (2013.01); *B29C 65/5042* (2013.01); *F05B 2230/23* (2013.01); *F05B 2240/302* (2013.01); *F05B 2260/301* (2013.01); *F05B 2260/96* (2013.01)

(58) Field of Classification Search
None
See application file for complete search history.

(56) References Cited

U.S. PATENT DOCUMENTS

| 7,344,360 B2 | 3/2008 | Wetzel |
| 2009/0155084 A1 | 6/2009 | Livingston et al. |
| 2009/0162208 A1* | 6/2009 | Zirin ............... F03D 1/0675 416/226 |
| 2011/0091326 A1 | 4/2011 | Hancock |
| 2014/0003953 A1* | 1/2014 | Zeller ............... F03D 1/065 416/223 R |
| 2014/0169978 A1* | 6/2014 | Livingston ........ F03D 1/0675 416/226 |
| 2014/0186189 A1* | 7/2014 | Stege ............... B29D 99/0025 416/229 R |
| 2015/0300317 A1* | 10/2015 | Altmikus .......... F03D 13/10 416/235 |
| 2015/0369211 A1 | 12/2015 | Merzhaeuser |

(Continued)

FOREIGN PATENT DOCUMENTS

DE  102012019351 A1 * 4/2014 ........... F03D 1/0675
EP  3144526 A1   3/2017

(Continued)

OTHER PUBLICATIONS

International Search Report, dated Jan. 10, 2020 for Application No. PCT/US2019/051879.

*Primary Examiner* — Michael Lebentritt
(74) *Attorney, Agent, or Firm* — Dority & Manning, P.A.

(57) ABSTRACT

A jointed wind turbine rotor blade includes a first blade segment and a second blade segment extending in opposite directions from a chord-wise joint line. Each of the blade segments includes a pressure side shell member and a suction side shell member. A sealing tape is applied over the shell members so as to bridge across the chord-wise joint line. The sealing tape includes side edges that are aligned parallel with airflow over the shell members at the chord-wise joint line at a defined load and operational condition on the jointed wind turbine blade.

10 Claims, 9 Drawing Sheets

(56) References Cited

U.S. PATENT DOCUMENTS

| | | | |
|---|---|---|---|
| 2016/0169190 A1* | 6/2016 | Neumann | F03D 1/0675 29/889.21 |
| 2016/0222941 A1* | 8/2016 | Tobin | F03D 1/0633 |
| 2017/0016426 A1* | 1/2017 | Kuhn | F03D 80/30 |
| 2017/0089323 A1* | 3/2017 | Yarbrough | F03D 1/0675 |
| 2017/0145986 A1* | 5/2017 | Baehmann | B33Y 50/00 |
| 2018/0051672 A1* | 2/2018 | Merzhaeuser | F03D 13/10 |
| 2018/0135602 A1* | 5/2018 | Tobin | F03D 80/30 |
| 2018/0216601 A1* | 8/2018 | Yarbrough | F03D 1/0675 |
| 2018/0266388 A1* | 9/2018 | Hallissy | F03D 1/0675 |
| 2018/0298879 A1* | 10/2018 | Johnson | F03D 1/0675 |
| 2019/0040842 A1* | 2/2019 | Yarbrough | F03D 1/0675 |
| 2019/0055921 A1* | 2/2019 | Danielsen | B29C 66/12261 |

FOREIGN PATENT DOCUMENTS

| | | |
|---|---|---|
| EP | 3333416 A1 | 6/2018 |
| WO | WO 2018121826 A1 | 7/2018 |

* cited by examiner initial unloaded state initial loaded state modified unloaded state modified loaded state

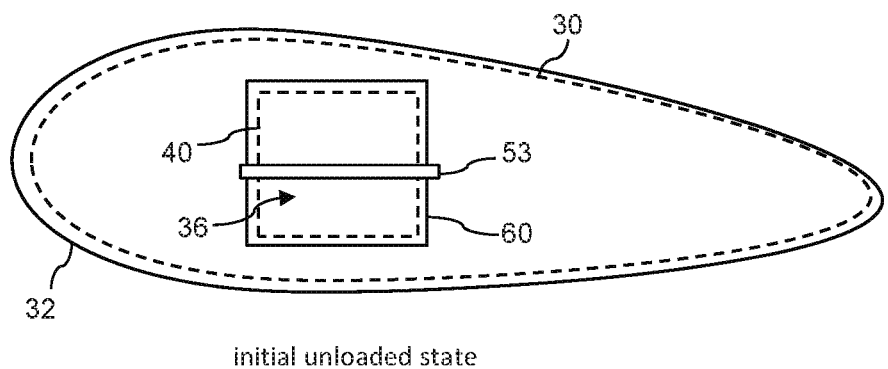
FIG. 9a — initial unloaded state
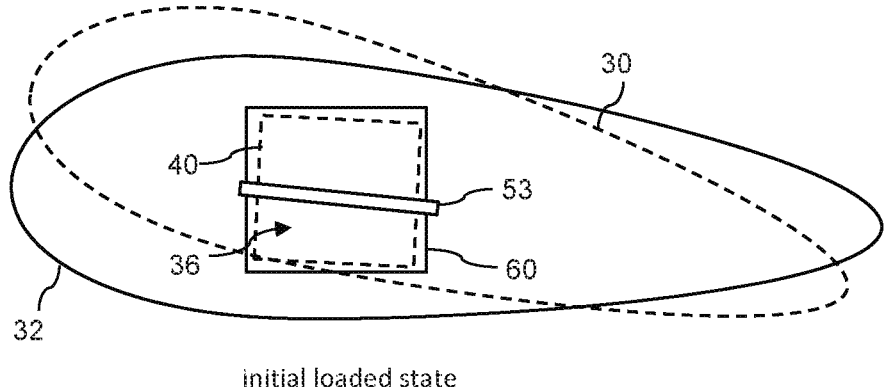
FIG. 9b — initial loaded state
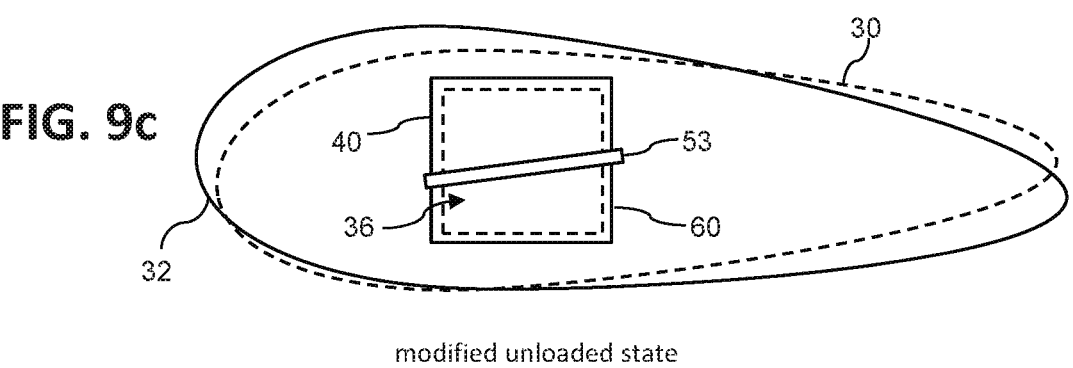
FIG. 9c — modified unloaded state
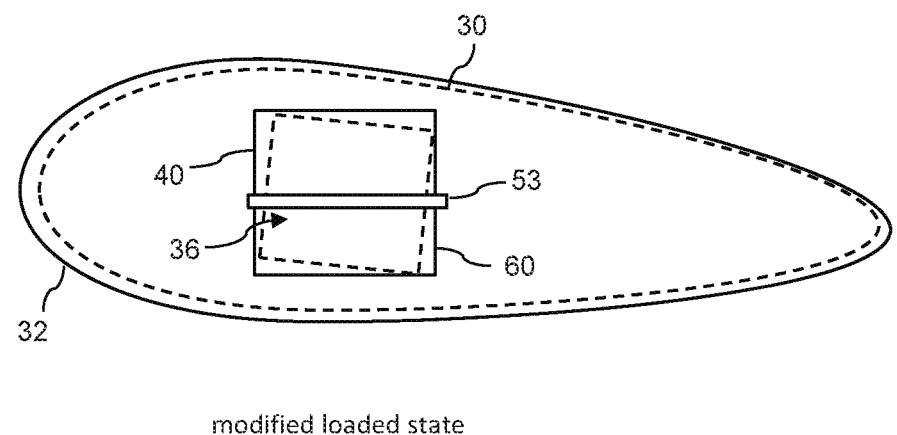
FIG. 9d — modified loaded state

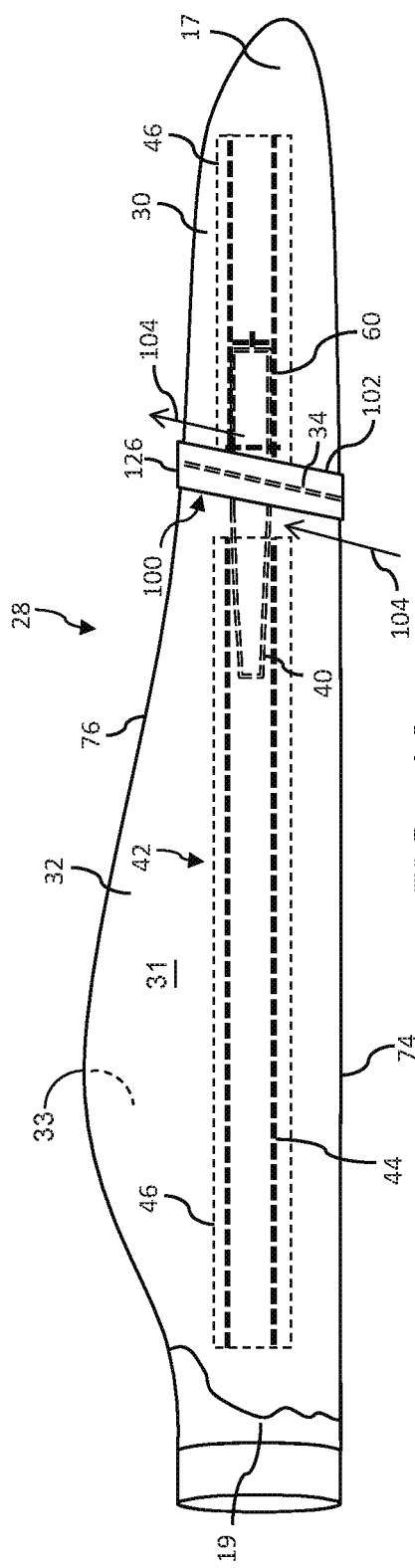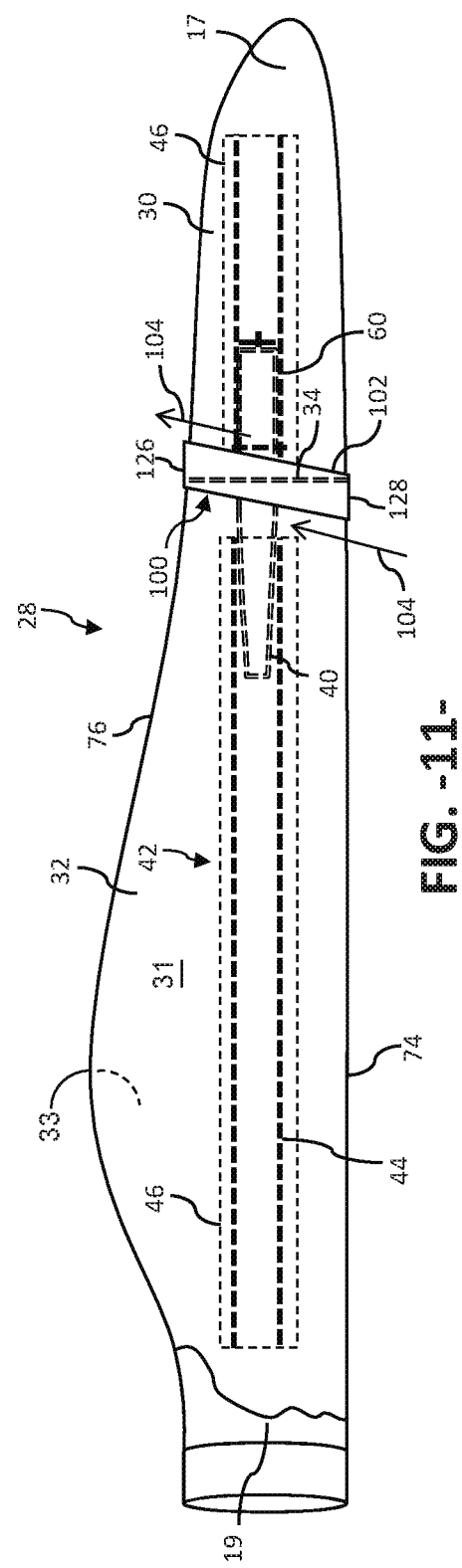

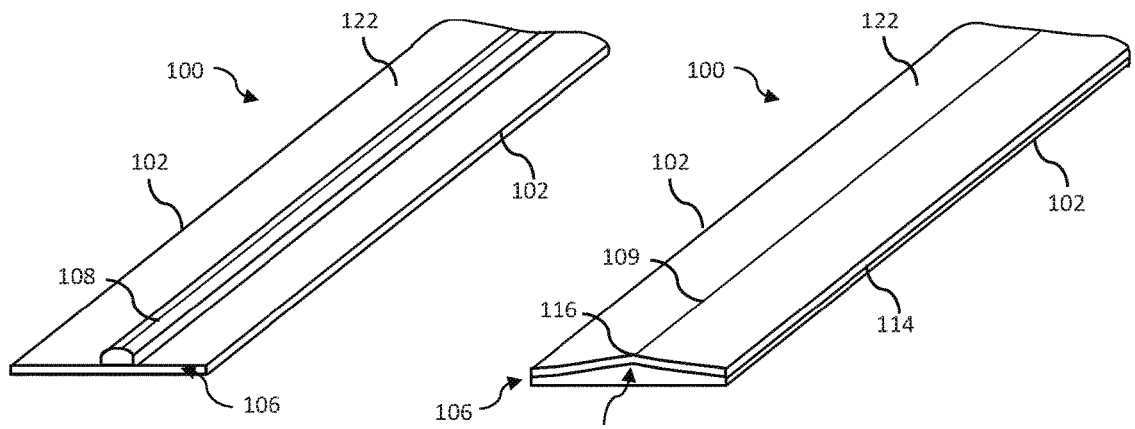
FIG. -12-   FIG. -13-
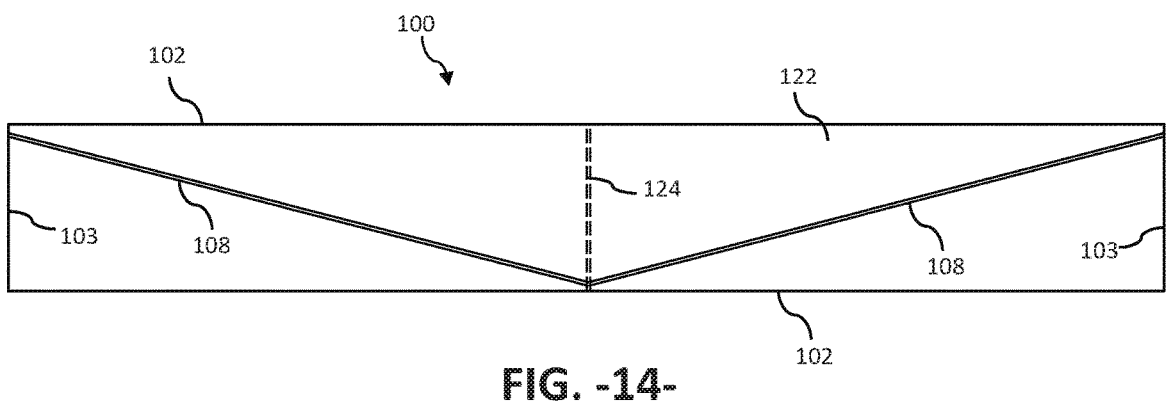
FIG. -14-
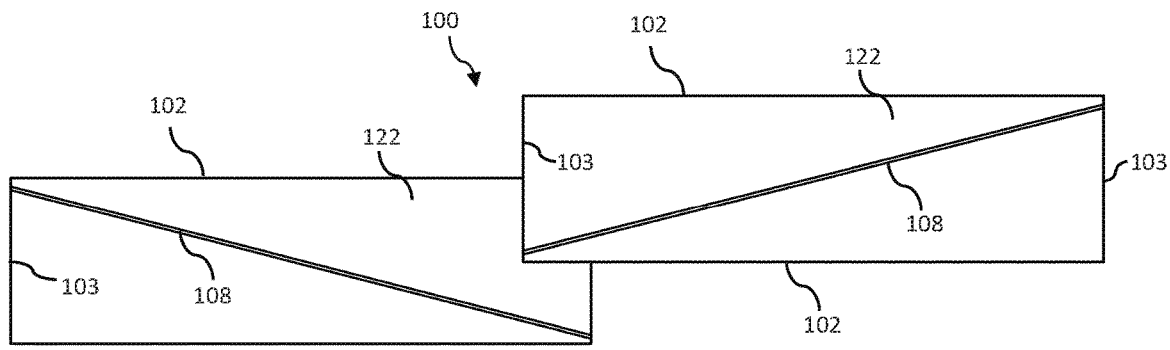
FIG. -15-

JOINTED WIND TURBINE BLADE WITH NOISE REDUCTION TAPE

FIELD

The present subject matter relates generally to wind turbine rotor blades and, more particularly, to a sealing tape configuration between segments of a jointed blade designed to reduce noise and vibration generated at the joint profile.

BACKGROUND

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy from wind using known foil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid.

Wind turbine rotor blades generally include a body shell formed by two shell halves of a composite laminate material. The shell halves are generally manufactured using molding processes and then coupled together along the corresponding ends of the rotor blade. In general, the body shell is relatively lightweight and has structural properties (e.g., stiffness, buckling resistance, and strength) which are not configured to withstand the bending moments and other loads exerted on the rotor blade during operation.

In recent years, wind turbines for wind power generation have increased in size to achieve improvement in power generation efficiency and to increase the amount of power generation. Along with the increase in size of wind turbines for wind power generation, wind turbine rotor blades have also significantly increased in size (e.g., up to 55 meters in length), resulting in difficulties in integral manufacture as well as conveyance and transport of the blades to a site.

In this regard, the industry is developing sectional wind turbine rotor blades wherein separate blade segments are manufactured and transported to a site for assembly into a complete blade (a "jointed" blade). In certain constructions, the blade segments are joined together by a beam structure that extends span-wise from one blade segment into a receiving section of the other blade segment. Reference is made, for example, to US Patent Publication No. 2015/0369211, which describes a first blade segment with a beam structure extending lengthways that structurally connects with a second blade segment at a receiving section. The beam structure forms a portion of the internal support structure for the blade and includes a shear web connected with a suction side spar cap and a pressure side spar cap. Multiple bolt joints are used to connect the beam structure with the receiving section in the second blade segment, including a span-wise bolt on the end face of the beam and at least one chord-wise bolt through the beam structure spaced from the joint line between the blade segments.

Similarly, US Patent Publication No. 2011/0091326 describes a jointed blade wherein a first blade portion and a second blade portion extend in opposite directions from a joint. Each blade portion includes a spar section forming a structural member of the blade and running lengthways, wherein the first blade portion and the second blade portion are structurally connected by a spar bridge that joins the spar sections. The spar bridge may be an extension of one of the spar sections that is received in a receiving spar section of the other blade portion. This configuration also uses a threaded bolt extending from the end face of the spar to connect and tension the spar in the receiving spar section.

It has been found, however, that the jointed blade configurations are susceptible to increased vibration and noise generation resulting from the joint. Relative deflections between the root-end blade segment and the tip-end blade segment result in flap-wise offsets between the shell members at the joint line. This situation is particularly present in the jointed blade designs that employ a chord-wise bolt or pin spaced (span-wise) from the joint line to transfer loads from the chord-wise bolt into the blade shells. This span-wise spacing, in combination with a difference in stiffness and orientation between the blade segment and jointed internal support structure, results in the flap-wise offsets between the shell members.

In addition to the induced flap-wise offset, torsion forces are also generated at the jointed structure that generate a twist offset between the shell members, particularly at the trailing edge of the blade.

As air flows over the shell surfaces under loaded conditions of the wind turbine, the flap-wise and/or twist-wise offsets at the joint line result in generation of turbulent vortices, which can add significantly to vibration and noise being generated at the joint line.

Therefore, an improved joint structure between the blade segments of a jointed blade that addresses the issues noted would be an advantageous advancement in the art.

BRIEF DESCRIPTION

Aspects and advantages of the invention will be set forth in part in the following description, or may be obvious from the description, or may be learned through practice of the invention.

In one aspect, the present disclosure is directed to a method to reduce noise and vibration in a joint configuration between a first blade segment and a second blade segment of a jointed wind turbine rotor blade. Each of the first and second blade segments include a shell member having a pressure side shell component and a suction side shell component. The method includes determining an actual offset that is induced at a chord-wise joint line between the shell members of the first and second blade segments at a load condition (under defined operational conditions) on the jointed wind turbine rotor blade, wherein the actual offset is any one or combination of a flap-wise offset generated by a flap-wise force, a twist-wise offset generated by a twist-wise force, or a yawl-wise offset generated by a yawl-wise force. Based on these induced offsets, a modified configuration of the joint structure is defined at a no-load condition on the wind turbine rotor blade that compensates at least partially for one or more of the actual offset components at the load condition. The first and second blade segments are then connected or joined with the modified configuration of the joint structure, wherein at the load condition, the modified configuration of the joint structure reduces one or both of the flap-wise offset and the twist-wise offset between the shell members of the first and second blade segments.

The method is not limited to a particular joint structure between the blade segments. In a particular embodiment, however, the joint structure includes a beam structure extending span-wise from the first blade segment and a receiving section formed in the second blade segment for receipt of the beam structure, wherein the modified configuration of the joint structure includes a change in connection between the beam structure and the receiving section. For example, the first blade segment may be a tip-end blade segment, and the second blade segment is a root-end blade segment. The joint structure may include a chord-wise pin extending through the beam structure and the receiving section at a location spaced from the joint line in a span-wise direction. The modified configuration of the joint structure may include an alternate location of the chord-wise pin that compensates for one or more of the flap-wise offset, twist-wise offset, or yawl-wise offset at the load condition. The alternate location may be selected to produce one or more of a counter flap-wise offset, counter twist-wise offset, or counter yawl-wise offset at the no-load condition.

In still another embodiment of the method, the step of determining the modified configuration of the joint structure includes determining a combination of materials in the joint structure that also may contribute to reducing one or more of the flap-wise offset, twist-wise offset, or yawl-wise offset at the load condition. This combination of materials may be a stand-alone modification to the joint structure, or may be in combination with a change in location of the chord-wise pin, or other alteration of the joint structure. The change in materials may include, for example adding or removing materials from the joint structure to achieve a stiffness or torsion resistance that reduces one or more of the flap-wise offset, twist-wise offset, or yawl-wise offset at the load condition.

In particular embodiments, the load/operational condition are the variables when approaching rated output speed of a wind turbine on which the jointed wind turbine rotor blade is used, and the flap-wise offset, twist-wise offset, or yawl-wise offset at the load condition are based on an average of the respective offsets at the rated output speed over a certain range of wind speed. This determination may be an actual measurement from operational wind turbines, or may be made via computer modeling of the jointed wind turbine blade at the load condition.

The present invention also encompasses a jointed wind turbine rotor blade with joint structure having the characteristics discussed above. In particular, such a blade includes a first blade segment and a second blade segment extending in opposite directions from a chord-wise joint line, each of the blade segments having a pressure side shell member and a suction side shell member. A joint structure is provided between the first blade segment and the second blade segment, wherein the joint structure includes a counter offset at a no-load condition on the rotor blade that compensates for one or more of a flap-wise offset, twist-wise offset, or yawl-wise offset at a load condition. With this configuration, the joint structure reduces noise and vibration generated by the jointed wind turbine rotor blade at the load condition.

In a particular blade embodiment, the joint structure includes a beam structure extending span-wise from the first blade segment, and a receiving section formed in the second blade segment for receipt of the beam structure. The first blade segment may be a tip-end blade segment, while the second blade segment is a root-end blade segment. The joint structure may include a chord-wise pin extending through the beam structure and the receiving section at a location spaced from the joint line in a span-wise direction, wherein the chord-wise pin is at a location that generates at least partly the counter offset at the no-load condition.

In a particular embodiment of the rotor blade, the joint structure includes a combination of materials that may also aid in reducing one or more of the flap-wise offset, twist-wise offset, or yawl-wise offset at the load condition. This combination of materials may be a stand-alone modification to the joint structure, or may be in combination with a change in location of the chord-wise pin. The change is materials may include, for example adding or removing materials from the joint structure to achieve a stiffness or torsion resistance that reduces one or both of the flap-wise offset and the twist-wise offset at the load condition.

The present invention also encompasses a jointed wind turbine rotor blade with a sealing tape configuration that reduces blade vibration and noise at operating conditions of the wind turbine. The jointed wind turbine rotor blade includes a first blade segment and a second blade segment extending in opposite directions from a chord-wise joint line, wherein each of the blade segments has a pressure side shell member and a suction side shell member. A sealing tape is applied over the pressure side shell member and the suction side shell member along the chord-wise joint line. The sealing tape has side edges that are aligned parallel with airflow over the pressure side shell member and the suction side shell member at the chord-wise joint line at a defined load/operational condition on the jointed wind turbine blade. The tape edges and cross-sectional shape of the tape define a raised profile relative to the surface of the shell members. By aligning the edges of the tape to be parallel to airflow over the blade, the noise and blade vibrations that would otherwise be induced by the presence of the tape are minimized.

The sealing tape may have a constant cross-sectional profile along an entire longitudinal length thereof, wherein such profile may include a relatively thick center section that tapers to the opposite side edges of the tape. In a particular embodiment, the sealing tape may include a deformable medial spacer designed to protrude or fit between the first and second blade segments along the chord-wise joint line. This spacer may serve to dampen any one or combination of the flap-wise, twist-wise, or yawl-wise forces acting on the replacement blade tip segment, as discussed above.

In certain embodiments, the chord-wise joint line is also oriented parallel with the airflow over the pressure side shell member and the suction side shell member at the load condition. However, this embodiment may increase the complexity, time, and expense of the joint structure between the blade segments. Thus, in another embodiment, the length of the chord-wise joint line is minimized and is oriented generally perpendicular to a leading edge of the jointed wind turbine blade. With this arrangement, the side edges of the sealing tape are non-parallel to the chord-wise joint line, but are maintained parallel to airflow over the blade surfaces. With this embodiment, the sealing tape may include the deformable spacer, wherein the spacer is defined on an underside of the sealing tape in a non-parallel orientation relative to the side edges of the sealing tape.

With the above embodiment, the sealing tape may be continuous and have a length so as to wrap around the pressure and suction side shell members, wherein opposite ends of the sealing tape meet at a trailing edge of the jointed wind turbine blade. The spacer in this embodiment extends at opposite and equal angles from a mid-point of the sealing tape.

In another embodiment, the sealing tape includes a first tape segment applied to the pressure side shell member and a second tape segment applied to the suction side shell member, wherein the first and second tape segments are joined at a first seam at a leading edge of the jointed wind turbine blade and a second seam at a trailing edge of the jointed wind turbine blade.

The sealing tape may be made of any suitable pliable material that can conform to the shape of the blade shell members, such as a natural or synthetic web material, a vinyl or plastic material, a composite material, and the like. The sealing tape can be applied to the blade shell members with any suitable adhesive. In a particular embodiment, the sealing tape includes a pre-applied adhesive on an underside thereof for attachment to the pressure and suction side shell members.

These and other features, aspects, and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIGS. 9a through 9d are sequential diagram views of an embodiment for modifying the joint structure in a jointed wind turbine blade to compensate for twist-wise induced offsets at a load condition on the blade;

FIG. 10 is a view of an embodiment of a jointed wind turbine blade with a sealing tape in accordance with additional aspects of the invention;

FIG. 11 is a view of an alternative embodiment of a jointed wind turbine blade with sealing tape;

FIG. 12 is a perspective view of an embodiment of a sealing tape;

FIG. 13 is a perspective view of an alternative embodiment of a sealing tape;

FIG. 14 is an underside view of an embodiment of a sealing tape that incorporates a spacer structure;

FIG. 15 is an underside view of a sealing tape configuration that utilizes separate tape strips.

DETAILED DESCRIPTION OF THE INVENTION

Figure 1:
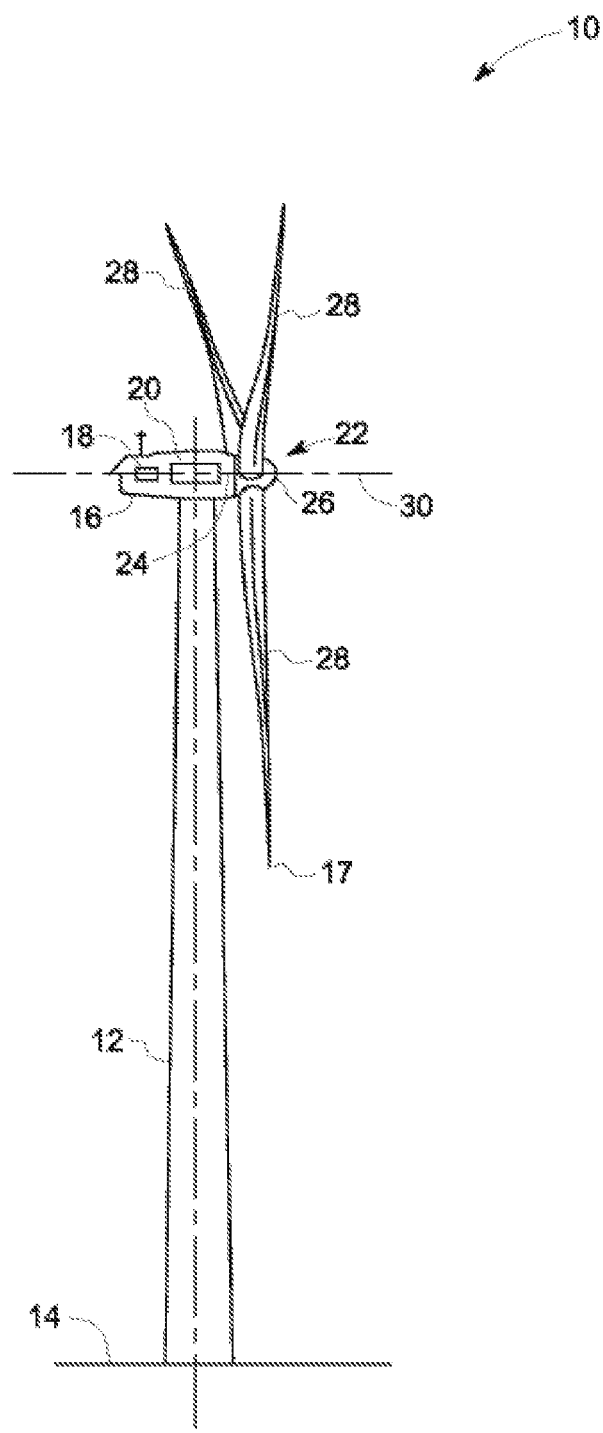
FIG. 1 illustrates a perspective view of a wind turbine that may utilize a jointed wind turbine blade according to the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present subject matter is directed to jointed wind turbine rotor blades having a modified joint structure configuration that serves to compensate for or counter one or both of flap-wise and twist-wise offsets between the blade segments at a load condition on the rotor blade. With the present unique method and rotor blade configuration, noise and vibration generated at the joint line between the blade segments is reduced.

Referring now to the drawings, FIG. 1 is a side view of an exemplary wind turbine 10 that may use jointed wind turbine rotor blades in accordance with an embodiment of the present invention. In this embodiment, the wind turbine 10 is a horizontal-axis wind turbine. Alternatively, the wind turbine 10 may be a vertical-axis wind turbine. In the present embodiment, the wind turbine 10 includes a tower 12 that extends from a support surface 14, a nacelle 16 mounted on the tower 12, a generator 18 positioned within the nacelle 16, a gearbox 20 coupled to the generator 18, and a rotor 22 that is rotationally coupled to the gearbox 20 with a rotor shaft 24. The rotor 22 includes a rotatable hub 26 and at least one rotor blade 28 coupled to and extending outward from the rotatable hub 26. As shown, the rotor blade 28 includes a blade tip 17 to a blade root 19.

Figure 2:
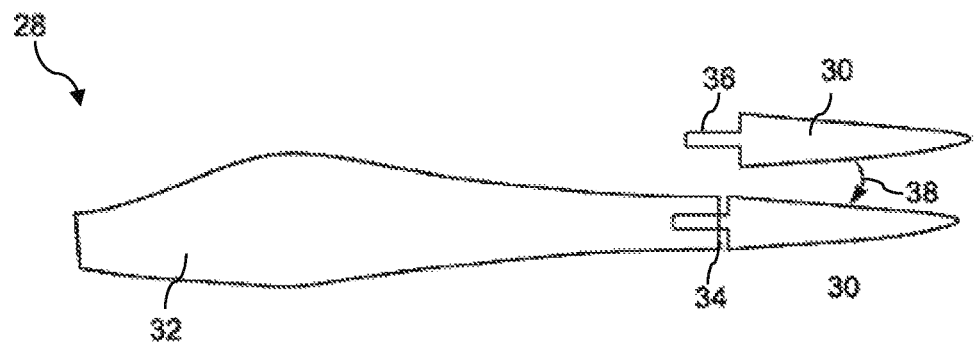
FIG. 2 illustrates a rotor blade having a first blade segment and a second blade segment, and joint structure that connects the blade segments.
Figure 3:
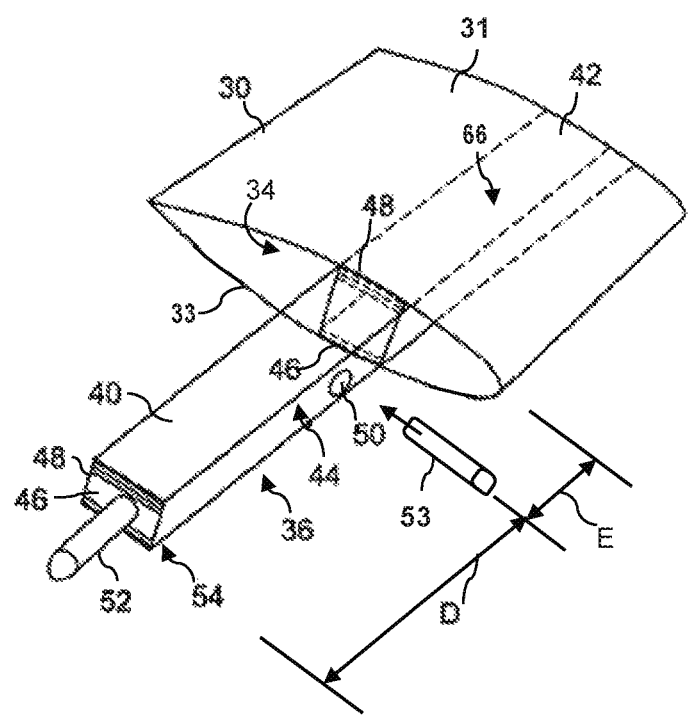
FIG. 3 is a perspective view of an embodiment of a first blade segment with joint structure.

Referring to FIGS. 2 and 3, a jointed rotor blade 28 is depicted having a first blade segment 30 and a second blade segment 32 in accordance with aspects of the present technology. The first blade segment 30 and the second blade segment 32 extend in opposite directions from a chord-wise joint line 34. Each of the blade segments 30, 32 includes a pressure side shell member 31 and a suction side shell member 33. The first blade segment 30 and the second blade segment 32 are connected by an internal support structure 36 extending into both blade segments 30, 32 to facilitate joining of the blade segments 30, 32. The arrow 38 shows that the segmented rotor blade 28 in the illustrated example includes two blade segments 30, 32 and that these blade segments 30, 32 are joined by inserting the internal support structure 36 into the second blade segment 32.

In the depicted embodiment, the first blade segment includes a beam structure 40 that forms a portion of the internal support structure 36 and extends lengthways (e.g., span-wise) for structurally connecting with the internal support structure 36 in the second blade segment 32. The beam structure 40 may be integrally formed with the first blade segment 30 as an extension protruding from a spar section 42, thereby forming an extended spar section. The beam structure 40 includes at least one interconnecting web 44 (e.g., a shear web) connected with a suction side spar cap 46 and a pressure side spar cap 48. In the illustrated embodiments, the beam structure 40 is formed as a box-type structure having opposite interconnecting webs 44.

The first blade segment 30 may include one or more first bolt joints (also referred to as "pins") towards a first end 54 of the beam structure 40. For example, a bolt 52 may be located on the end 54 of the beam structure 40 and oriented in a span-wise direction. The first blade segment 30 may also include a bolt joint slot 50 located on the beam structure 40 proximate to the chord-wise joint 34 and oriented in a chord-wise direction. There may be a bushing within the bolt joint slot 50 arranged in a tight interference fit with a bolt tube or pin 53 used to connect the second blade segment 32 to first blade segment 30. It should be appreciated that any combination of bolt tubes 52, 53 and bolt slots 50 may be configured between the beam structure 40 and a receiving section 60 (FIG. 4) for the purpose of interconnecting the first 30 and second 32 blade segments.

Figure 4:
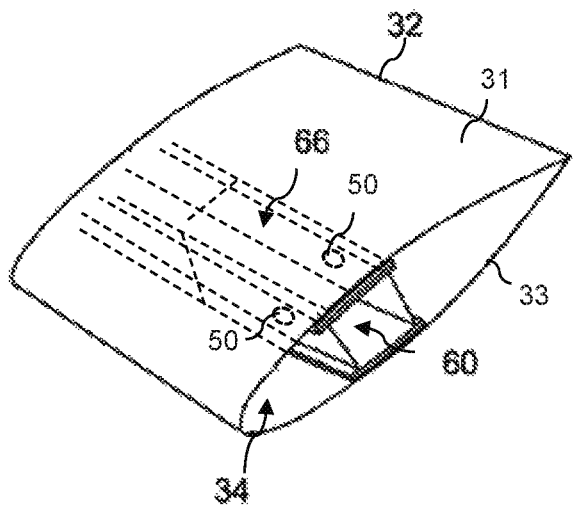
FIG. 4 is a perspective view of an embodiment of a second blade segment with joint structure.

In FIG. 4, the second blade segment 32, the internal support structure 36 includes a receiving section 60 extending lengthways (span-wise) within the second blade segment 32 for receiving the beam structure 40 of the first blade segment 30. The receiving section 60 includes multiple spar structure components 66 that extend lengthways for connecting with the beam structure 40 of the first blade segment 30 along a length of the receiving section 60. Although not depicted in FIG. 4, it is readily understood that the receiving section 60 includes any combination of bolt slots 50 or bolts 52, 53 for interconnecting with corresponding bolts or slots of the beam structure 40. For example, a bolt slot is configured in a distal end (away from the chord-wise joint 34) of the receiving section 60 for receipt of the bolt 52 provided on the end 54 of the beam structure 40.

Figure 5:
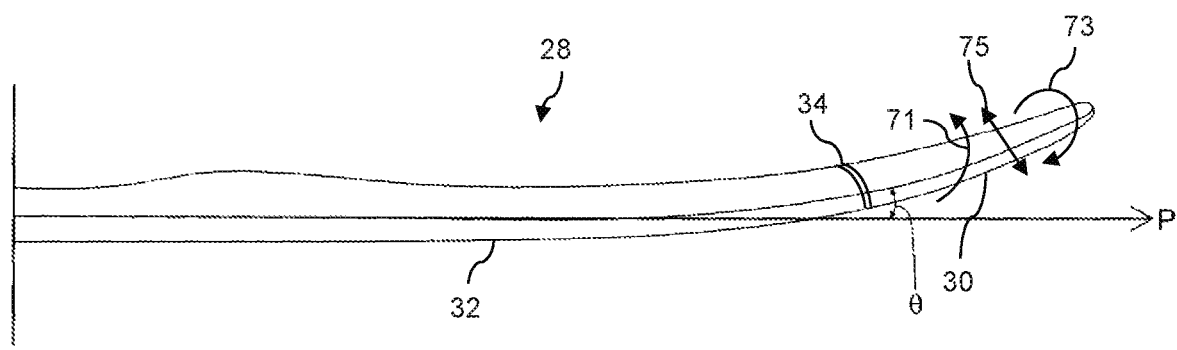
FIG. 5 is a perspective view of a jointed wind turbine blade depicting with flap-wise and twist-wise forces acting on the blade.

FIG. 5 depicts the concepts of flap-wise 71, twist-wise 73, and yawl-wise 75 forces acting on the jointed wind turbine blade, wherein such forces can respectively generate a flap-wise offset 70 (FIG. 6), a twist-wise offset 72 (FIG. 7), and a yawl-wise offset 77 (FIG. 6) between the shell components of the first and second blade segments 30, 32 at the chord-wise joint 34. These offset components 70, 72, and 77 can combine to induce an actual offset 68 between the shell components. The flap-wise forces 71 tend to act uniformly across the chord aspect of the first blade segment 30 causing the first blade segment 30 to essentially "bend" towards the second blade segment 32 and displace the shell members 31 in a vertical direction 70 along the chord-wise joint 34. The twist-wise forces 73 tend to generate a twisting of the first blade segment 30 relative to the second blade segment 32 along a span-wise axis of the blade resulting in a twist-wise offset 72 of the shell members 31 along the chord-wise joint 34. The yawl-wise forces 75 tend to generate a side-ways movement of the first blade segment 30 relative to the second blade segment 32 transverse to the span-wise axis of the blade resulting in a yawl-wise offset 77 of the shell members 31 along the chord-wise joint 34. As explained above, these induced offsets 70, 72, 77 can generate excessive vibrations and noise in the blade 28 at operational load on the wind turbine (load on the turbine blades 28 when the wind turbine 10 is operating in the rated power output range of the power curve).

Figure 6:
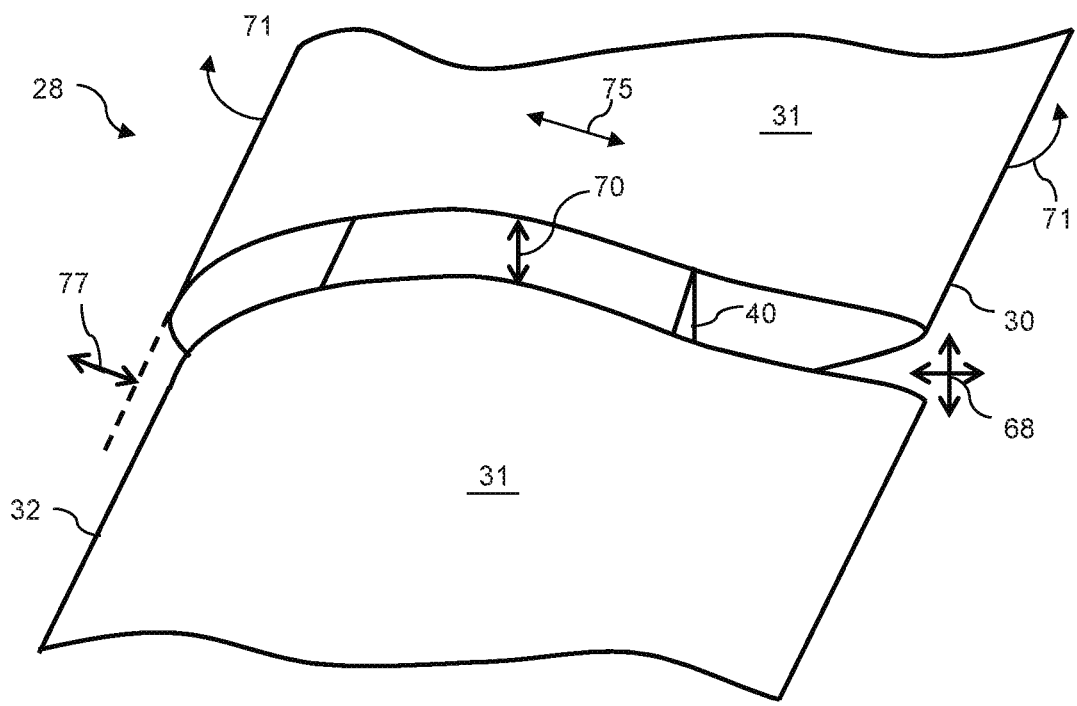
FIG. 6 is a partial perspective view of the joint line between blade segments depicting a flap-wise induced offset between the blade segments at the joint line.
Figure 7:
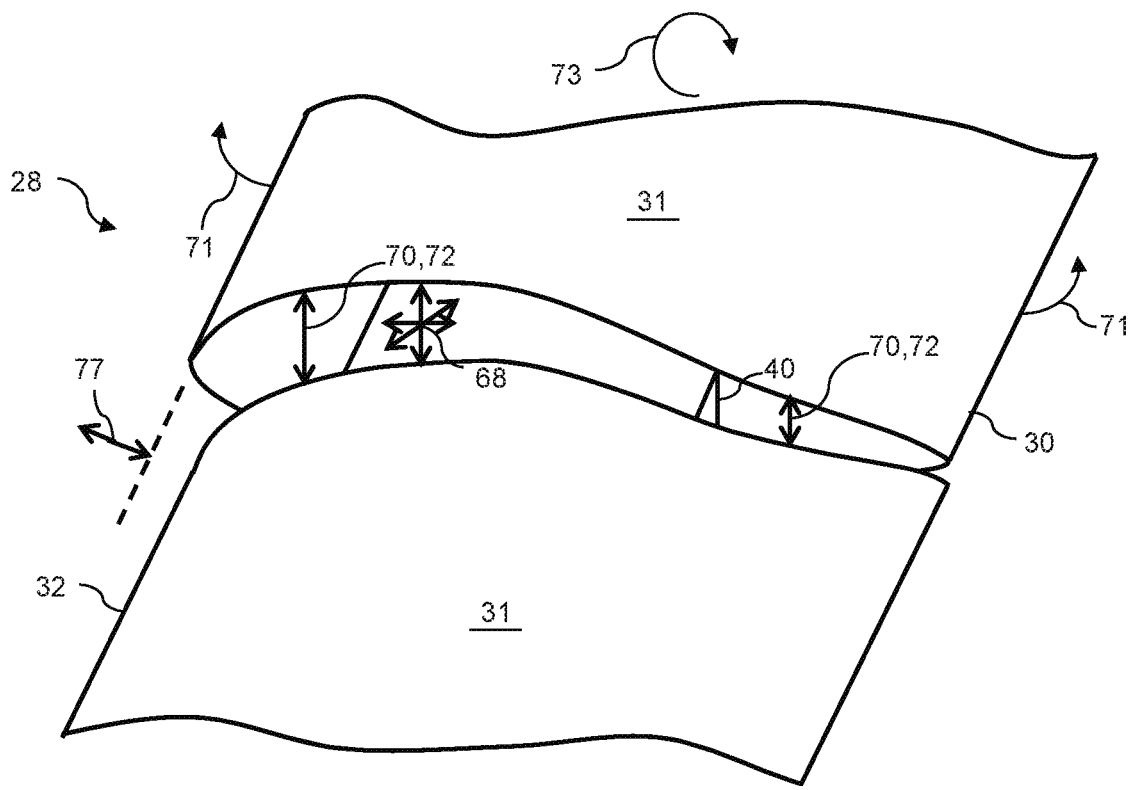
FIG. 7 is a partial perspective view of the joint line between blade segments depicting a flap-wise and twist-wise induced offset between the blade segments at the joint line.

FIG. 6 depicts the actual offset 68 as a combination of the flap-wise offset 70 and the yawl-offset 77. FIG. 7 depicts the actual offset 68 as a combination of the flap-wise offset 70, the twist-wise offset 72, and the yawl-wise offset 77. It should be appreciated that the actual offset 68 may be induced from any one or combination of the offset components 70, 72, and 77.

In addition, referring to FIG. 5, the blades 28 may be designed with a no-load moderate sweep inboard (closer to blade root) relative to blade pitch axis P, while the outboard section (closer to the blade tip) may be swept aft up to 10 degrees (angle $\theta$ in FIG. 5) relative to pitch axis P.

In FIGS. 8A through 8d, determination and compensation for a flap-wise offset 70 induced in the blade 28 under load is depicted in accordance with aspects of the present disclosure. Similarly, in FIGS. 9a through 9d, determination and compensation for a twist-wise offset 72 induced in the blade 28 under load is depicted. It should be appreciated that similar methods can be employed for determination and compensation for the yawl-wise offset.

Figure 8A:
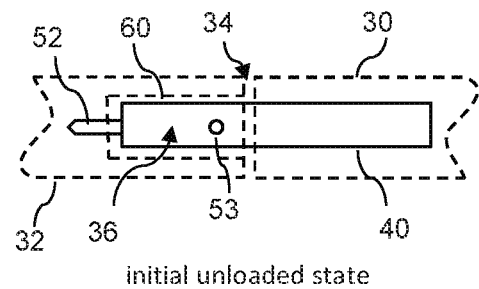
FIGS. 8a through 8d are sequential diagram views of an embodiment for modifying the joint structure in a jointed wind turbine blade to compensate for flap-wise induced offsets at a load condition on the blade.
Figure 8B:
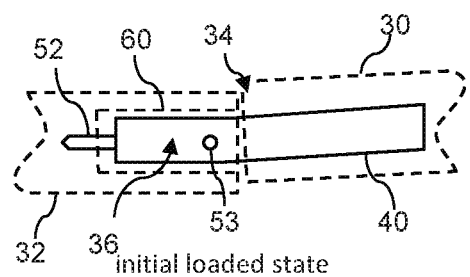

Referring to FIGS. 8a and 9a, the jointed blade 28 is depicted at the chord-wise joint 34 in an initial unloaded condition wherein an initial negligible flap-wise or twist-wise offset is induced in the blade at the joint 34. FIG. 8b depicts the same jointed blade 28 at an initial loaded condition, for example under load at rated power of the wind turbine, wherein a flap-wise offset 70 is depicted between the shell members of the first blade segment 30 and the second blade segment 32 at the chord-wise joint 34. Similarly, FIG. 9b, depicts the jointed blade 28 in an initial loaded condition, for example under load when approaching or at rated power of the wind turbine, wherein a twist-wise offset 72 is depicted between the shell members of the first blade segment 30 and the second blade segment 32 at the chord-wise joint 34. The present method includes determining the magnitude of one or both of the flap-wise offset 70 and twist-wise offset 72. This determination may be done by measurement of the actual offset at the chord-wise joint 34 with sensors, camera, and so forth, when the blade 28 (or similar blade) is under load at defined operational conditions. Alternatively, the actual offset may be determined via a suitable modeling program. As mentioned, it is appreciated that the actual offset 68 at the chord-wise joint 34 may be a combination of the flap-wise offset 70, the twist-wise offset 72, and the yawl-wise offset 77. Also, any one of these offsets may be negligible, wherein the actual offset is due primarily to one or a combination of the other offsets under load on the blade 28.

Figure 8C:
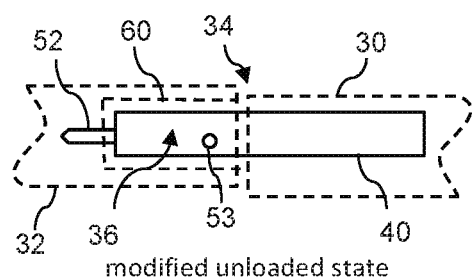

Referring to FIG. 8c, based on the actual offset induced at the joint 34 with the blade 28 under load, a modified configuration of the joint structure 36 is defined at a no-load condition on the blade 28 that will compensate for the induced offset. This modified configuration may only compensate for one of the flap-wise offset 70 or the twist-wise offset 72, but preferably compensates for both types of offsets 70, 72.

It should be appreciated that the present methods encompass the scenario wherein the actual offset 68 is determined empirically or via computer modeling for a particular type of blade at a defined location and under defined operational conditions, and this offset 68 is then used to define the modified configuration for a subsequent number of blades 28. It is not necessary to determine the actual offset and modified configuration on an individual basis for every blade 28.

As mentioned, the modified configuration of the joint structure 36 may include determining a combination of materials in the joint structure 36 that reduces one or both of the flap-wise offset 70 and the twist-wise offset 72 at the load condition. This combination of materials may be a stand-alone modification to the joint structure, or may be in combination with a change in location of the components of the joint structure 36, as described below. The change in materials may include, for example adding or removing materials from the joint structure 36 to achieve a stiffness or torsion resistance that reduces one or both of the flap-wise offset 70 and the twist-wise offset 72 at the load condition.

FIG. 8c depicts an embodiment wherein the joint structure 36 is structurally modified in an unloaded state of the blade 26 to compensate for the induced flap-wise offset 70 (FIG. 8b) at a load condition. In this embodiment, the joint structure 36 includes the beam structure 40 extending spanwise from the first blade segment 30 (tip-end segment) and a receiving section 60 formed in the second blade segment 32 (root-end segment) for receipt of the beam structure 40. The modified configuration of the joint structure 36 includes a change in connection between the beam structure 40 and the receiving section 60. The joint structure 36 includes a chord-wise pin 53 extending through the beam structure 40 and the receiving section 60 at a location spaced from the joint line 34 in a span-wise direction. An alternate location of the chord-wise pin 53 is determined that compensates for the flap-wise offset 70 at the load condition, wherein the alternate location is selected to produce a counter flap-wise offset 76 at the no-load condition on the blade 28. For example, as exaggerated in FIG. 8C for illustrative purposes, the chord-wise pin 53 may be lowered or raised towards the pressure or suction side of the blade 28 relative to the initial position depicted in FIG. 8a to produce the counter flap-wise offset 78.

Similarly, FIG. 9c depicts an embodiment wherein the joint structure 36 is structurally modified in an unloaded state of the blade 26 to compensate for the induced twist-wise offset 72 (FIG. 9b) at a load condition. The modified configuration of the joint structure 36 includes a change in connection between the beam structure 40 and the receiving section 60. The joint structure 36 includes the chord-wise pin 53 extending through the beam structure 40 and the receiving section 60 at a location spaced from the joint line 34 in a span-wise direction. An alternate location of the chord-wise pin 53 is determined that compensates for the twist-wise offset 72 at the load condition, wherein the alternate location is selected to produce a counter twist-wise offset 78 at the no-load condition on the blade 28. For example, as exaggerated in FIG. 9C for illustrative purposes, the chord-wise pin 53 may be rotated from the initial orientation depicted in FIG. 9a to the modified position in FIG. 9c to produce the counter twist-wise offset 78.

Figure 8D:
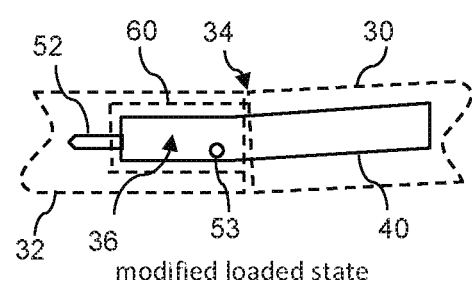
Figure 16:
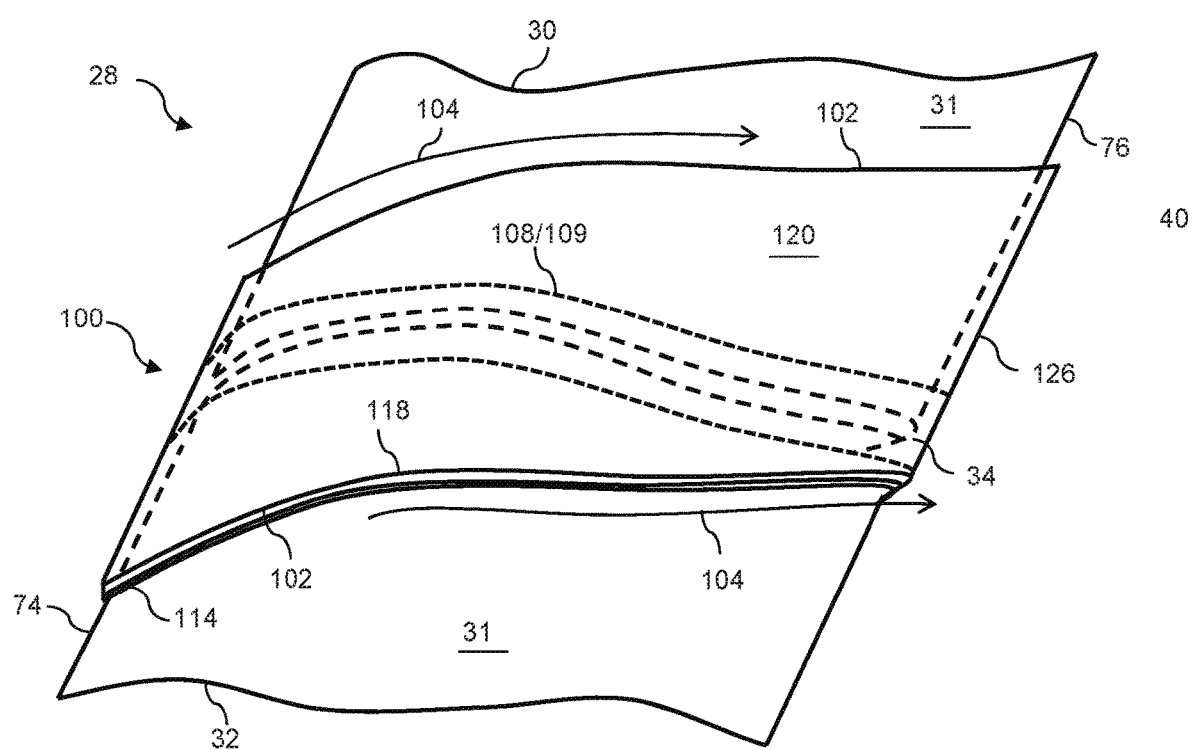
FIG. 16 is a partial perspective view of airflow over a jointed wind turbine blade with a sealing tape in accordance with aspects of the invention.

Once the modifications to the joint structure 36 are determined, the jointed blade 28 is assembled in accordance with such modifications. FIG. 8c depicts the modified assembled jointed blade 28 in an unloaded state, and FIG. 8d depicts the blade 28 under load wherein the flap-wise offset 70 present in FIG. 8b has been compensated for by the modifications depicted in FIG. 8c. Likewise, FIG. 9c depicts the modified assembled jointed blade 28 in an unloaded state, and FIG. 9d depicts the blade 28 under load wherein the twist-wise offset 72 present in FIG. 9b has been compensated for by the modifications depicted in FIG. 9c.

The present invention also encompasses a jointed wind turbine rotor blade 28 with joint structure 36 having the characteristics discussed above.

Referring to FIG. 10 through 16, the present invention also encompasses a jointed wind turbine rotor blade 28 with a sealing tape 100 configuration that reduces blade vibration and noise at operating conditions of the wind turbine. The jointed wind turbine rotor blade 28 includes the first blade segment 30 and second blade segment 32 extending in opposite directions from the chord-wise joint line 34, wherein each of the blade segments 30, 32 has a pressure side shell member 31 and suction side shell member 33. It should be appreciated that the sealing tape 100 configuration may be incorporated with the jointed wind turbine blade 28 having the characteristics discussed above with respect to the embodiments of FIGS. 2 through 9 and, in that regard, the discussion of FIGS. 2 through 9 is incorporated herein with respect to FIGS. 10 through 16. Alternatively, the sealing tape 100 configuration may be used as a stand-alone component on a jointed wind turbine blade that does not include the modified joint structure of FIGS. 2 through 9.

The sealing tape 100 is applied over the pressure side shell member 31 and the suction side shell member 33 so as to bridge across the chord-wise joint line 34. The sealing tape 100 has side edges 102 that protrude to at least some extend from the shell members 31, 33. The sealing tape is oriented on the shell members 31, 33 so that the side edges 102 are aligned parallel with airflow 104 over the shell members 31, 33 at the chord-wise joint line 34 at a defined load condition on the jointed wind turbine blade 28, such as the load condition at rated output speed of a wind turbine on which the jointed wind turbine rotor blade 28 is used. The tape edges 102 and cross-sectional shape of the tape 100 define a raised profile relative to the surface of the shell members 31, 33. By aligning the edges 102 of the tape 100 to be parallel to airflow 104 over the blade, the noise and blade vibrations that would otherwise be induced by the presence of the tape 100 are minimized.

The sealing tape 100 may have a constant cross-sectional profile 106 along an entire longitudinal length thereof, as depicted in FIGS. 12 and 13, wherein such profile may include a relatively thick center section 107 that tapers to the opposite side edges 102 of the tape. In a particular embodiment, the sealing tape 100 may include a deformable medial spacer 108 (FIG. 12) or wedge 109 (FIG. 13) formed or attached to an underside 122 of the tape 100 and designed to protrude or fit between the first 31 and second 32 blade segments along the chord-wise joint line 34, as depicted by the dashed lines in FIG. 16. This spacer 108 or wedge 109 is preferably formed of the same material as the tape 100 or may be a separate component that is fixed to the underside 122 of the tape 100. The spacer 108 or wedge 109 is compressible when forces acting on the blade tip segment 30 induce the offsets discussed above between the blade tip segment 30 and segment 32 and thus serve to dampen any one or combination of the flap-wise, twist-wise, or yawl-wise forces acting on the replacement blade tip segment 30.

It should be appreciated that "load condition" as used herein may also refer to defined operational conditions and environment determined or expected for the wind turbine that could affect flow over the blade and, thus, may entail more than consideration of load at a point on the wind turbine power curve.

Referring to FIG. 10, in certain embodiments, the chord-wise joint line 34 is also oriented parallel to the airflow 104 over the shell members 31, 33 at the load condition. However, this embodiment may increase the complexity, time, and expense of forming the joint structure between the blade segments 30, 32. Thus, in another embodiment depicted in FIG. 11, the length of the chord-wise joint line 34 is minimized and is oriented generally perpendicular to the leading edge 74 of the jointed wind turbine blade 28. With this arrangement, the side edges 102 of the sealing tape 100 are non-parallel to the chord-wise joint line 34, but are maintained parallel to airflow 104 over the blade surfaces, as seen in FIG. 11. With this embodiment, the sealing tape 100 may include the deformable spacer 108 or wedge 109, wherein the spacer 108 or wedge 109 are defined on the underside 122 of the sealing tape 100 in a non-parallel orientation relative to the side edges 102 of the sealing tape 100.

Referring to FIG. 14, with the above embodiment, the sealing tape 100 may be continuous and have a length so as to wrap around the pressure and suction side shell members 31, 33, wherein opposite ends of the sealing tape 100 meet at seam 126 (FIG. 10) at the trailing edge 76 of the jointed wind turbine blade 28. The spacer 108 or wedge 109 in this embodiment extends at opposite and equal angles from a mid-point 124 of the sealing tape 100 that corresponds to the relative location of the leading edge 74 when the tape 100 is applied on the blade 28.

Referring to FIGS. 11 and 15, in another embodiment, the sealing tape 100 includes a first tape segment 110 applied to the pressure side shell member 31 and a second tape segment 112 applied to the suction side shell member 33, wherein the first 110 and second 112 tape segments are joined at a first seam 128 at the leading edge 74 of the jointed wind turbine blade 28 and a second seam 126 at the trailing edge 76 of the jointed wind turbine blade 28.

The sealing tape 100 may be made of any suitable pliable material that can conform to the shape of the blade shell members 31, 33, such as a natural or synthetic web material, a vinyl or plastic material, a composite material, and the like. The sealing tape can be applied to the blade shell members with any suitable adhesive. In a particular embodiment, the sealing tape 100 includes a pre-applied adhesive layer 114 (FIGS. 13 and 16) on the underside 122 thereof for attachment to the pressure 31 and suction 3 side shell members.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A jointed wind turbine rotor blade, comprising:
    a first blade segment and a second blade segment extending in opposite directions from a chord-wise joint line, each of the blade segments having a pressure side shell member and a suction side shell member;
    a sealing tape applied over the pressure side shell member and the suction side shell member along the chord-wise joint line; and
    the sealing tape comprising side edges that are aligned parallel with airflow over the pressure side shell member and the suction side shell member at the chord-wise joint line at a defined load and operational condition on the jointed wind turbine blade.

2. The jointed wind turbine blade as in claim 1, wherein the chord-wise joint line is also oriented parallel with the airflow over the pressure side shell member and the suction side shell member at the defined load and operational condition.

3. The jointed wind turbine blade as in claim 1, wherein the sealing tape comprises a constant cross-sectional profile along an entire longitudinal length thereof.

4. The jointed wind turbine blade as in claim 1, wherein the sealing tape further comprises a deformable spacer that protrudes between the first and second blade segments along the chord-wise joint line.

5. The jointed wind turbine blade as in claim 1, wherein the chord-wise joint line is oriented generally perpendicular to a leading edge of the jointed wind turbine blade such that the side edges of the sealing tape are non-parallel to the chord-wise joint line.

6. The jointed wind turbine blade as in claim 5, wherein the sealing tape further comprises a deformable spacer that protrudes between the first and second blade segments along the chord-wise joint line, the spacer defined on an underside of the sealing tape in a non-parallel orientation relative to the side edges of the sealing tape.

7. The jointed wind turbine blade as in claim 6, wherein the sealing tape is continuous and comprises a length so as to wrap around the pressure and suction side shell members, wherein opposite ends of the sealing tape meet at a trailing edge of the jointed wind turbine blade, the spacer extending at opposite and equal angels from a mid-point of the sealing tape.

8. The jointed wind turbine blade as in claim 6, wherein the sealing tape comprises a first tape segment applied to the pressure side shell member and a second tape segment applied to the suction side shell member, the first and second tape segments joined at a first seam at a leading edge of the jointed wind turbine blade and a second seam at a trailing edge of the jointed wind turbine blade.

9. The jointed wind turbine blade as in claim 1, wherein the sealing tape comprises a pre-applied adhesive on an underside thereof for attachment to the pressure and suction side shell members.

10. The jointed wind turbine blade as in claim 1, wherein the sealing tape comprises a constant cross-sectional profile having a raised medial portion that tapers to the opposite side edges along an entire longitudinal length thereof.

* * * * *